US008567119B2

(12) United States Patent
Kepes et al.

(10) Patent No.: US 8,567,119 B2
(45) Date of Patent: Oct. 29, 2013

(54) FRAME FOR FLORAL FOAM

(76) Inventors: George Kepes, Studio City, CA (US); Fang Jianping, Lakewood, CA (US)

( * ) Notice: Subject to any disclaimer, the term of this patent is extended or adjusted under 35 U.S.C. 154(b) by 196 days.

(21) Appl. No.: 13/074,163

(22) Filed: Mar. 29, 2011

(65) Prior Publication Data
US 2012/0247014 A1 Oct. 4, 2012

(51) Int. Cl.
*A01G 5/04* (2006.01)
*A47G 7/03* (2006.01)

(52) U.S. Cl.
USPC .................................. 47/41.12; 47/41.01

(58) Field of Classification Search
USPC .................. 47/41.01, 41.12, 41.13; 428/10
See application file for complete search history.

(56) References Cited

U.S. PATENT DOCUMENTS

| 274,006 | A | * | 3/1883 | Kuehn | 248/27.8 |
|---|---|---|---|---|---|
| 2,121,173 | A | * | 6/1938 | MacPherson | 47/33 |
| 3,962,825 | A | | 6/1976 | O'Connell | |
| 4,058,929 | A | | 11/1977 | O'Connell | |
| 4,092,801 | A | | 6/1978 | Schoenherr et al. | |
| 5,588,253 | A | | 12/1996 | Boodley et al. | |
| 5,693,380 | A | * | 12/1997 | O'Connell | 428/3 |
| 6,079,154 | A | * | 6/2000 | Farwell | 47/66.7 |
| 6,688,040 | B1 | * | 2/2004 | Yang | 47/41.1 |
| 8,151,516 | B1 | * | 4/2012 | Harshman | 47/41.01 |

FOREIGN PATENT DOCUMENTS

DE   102006059483 A1 *  6/2008   ............... A01G 5/04

OTHER PUBLICATIONS

Machine translation of DE 102006059483 to Schwenn, Jun. 2008.*

* cited by examiner

*Primary Examiner* — Rob Swiatek
*Assistant Examiner* — Kathleen Alker
(74) *Attorney, Agent, or Firm* — Morgan, Lewis & Bockius LLP

(57) ABSTRACT

A support structure is configured to be pierced by stems of flowers to hold the flowers in place and to retain moisture. The support structure extends along a longitudinal path and has front and rear surfaces and two opposite side surfaces. A backplate overlies the support structure's rear surface. A frame overlies the support structure and is attached to the backplate to hold the support structure against the backplate. The frame includes longitudinal bands that extend along the longitudinal path along the support structure. The frame further includes cross bands that extend about the support structure's front and side surfaces in directions that are perpendicular to the longitudinal band. Each cross band crosses the longitudinal bands at crossing points at which the longitudinal band is perpendicular to and adjoined to and underlying the respective longitudinal band.

12 Claims, 16 Drawing Sheets

FRAME FOR FLORAL FOAM

TECHNICAL FIELD

This application relates to floral arrangements comprising flowers secured to floral foam.

BACKGROUND

A floral arrangement includes cut flowers held in place by a support structure of floral foam. The floral foam is commercially available in many shapes, including a ring shape for making floral wreaths. To make the arrangement, a florist pierces each flower's stem into the foam, thereby forming a channel in the foam that snugly holds the respective flower in place. The flowers can be sufficient in number to completely hide the foam from view.

SUMMARY

A support structure is configured to be pierced by stems of flowers to hold the flowers in place and to retain moisture. The support structure has front and rear surfaces and two opposite side surfaces. The side surfaces extend along a longitudinal path. A backplate overlies the support structure's rear surface. A frame overlies the support structure and is attached to the backplate to hold the support structure against the backplate. The frame includes longitudinal bands that follow the longitudinal path and overlie the support structure. The frame further includes cross bands that extend about the support structure's front and side surfaces in directions that are perpendicular to the longitudinal band. Each cross band crosses each longitudinal band at a crossing point at which the longitudinal band is perpendicular to and adjoined to and underlying the respective longitudinal band.

The support structure is segmented into at least two segments with a transversely-extending gap in-between. A plate-shaped spacer, of a different material than the support structure, extends transversely in the gap and has a peripheral edge respectively adjacent the support structure's front edge and side edges. The cross bands include a spacer-overlying band that overlies the spacer's front edge and side edges to retain the spacer in the gap.

DETAILED DESCRIPTION

The apparatuses shown in the figures have parts that are examples of the elements recited in the claims. The apparatuses thus include examples of how a person of ordinary skill in the art can make and use the claimed invention. They are described here to meet the requirements of enablement and best mode without imposing limitations that are not recited in the claims.

Ring Embodiment

Figure 1:
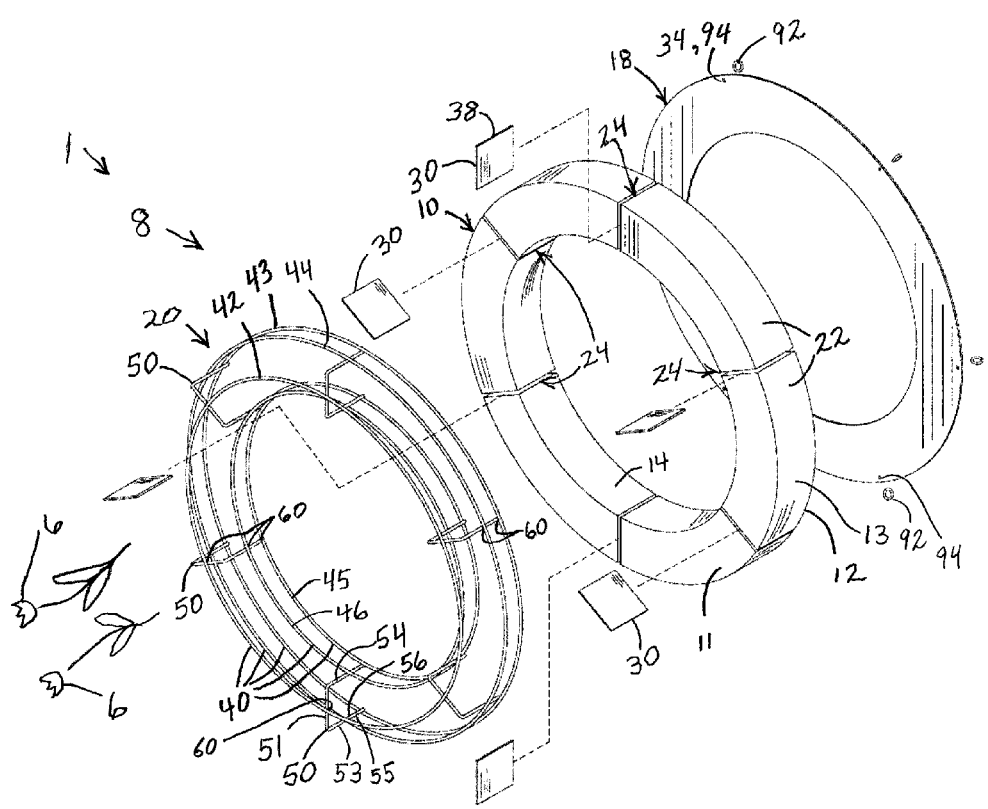
FIG. 1 is an exploded perspective view of a floral arrangement including a first floral support.
Figure 2:
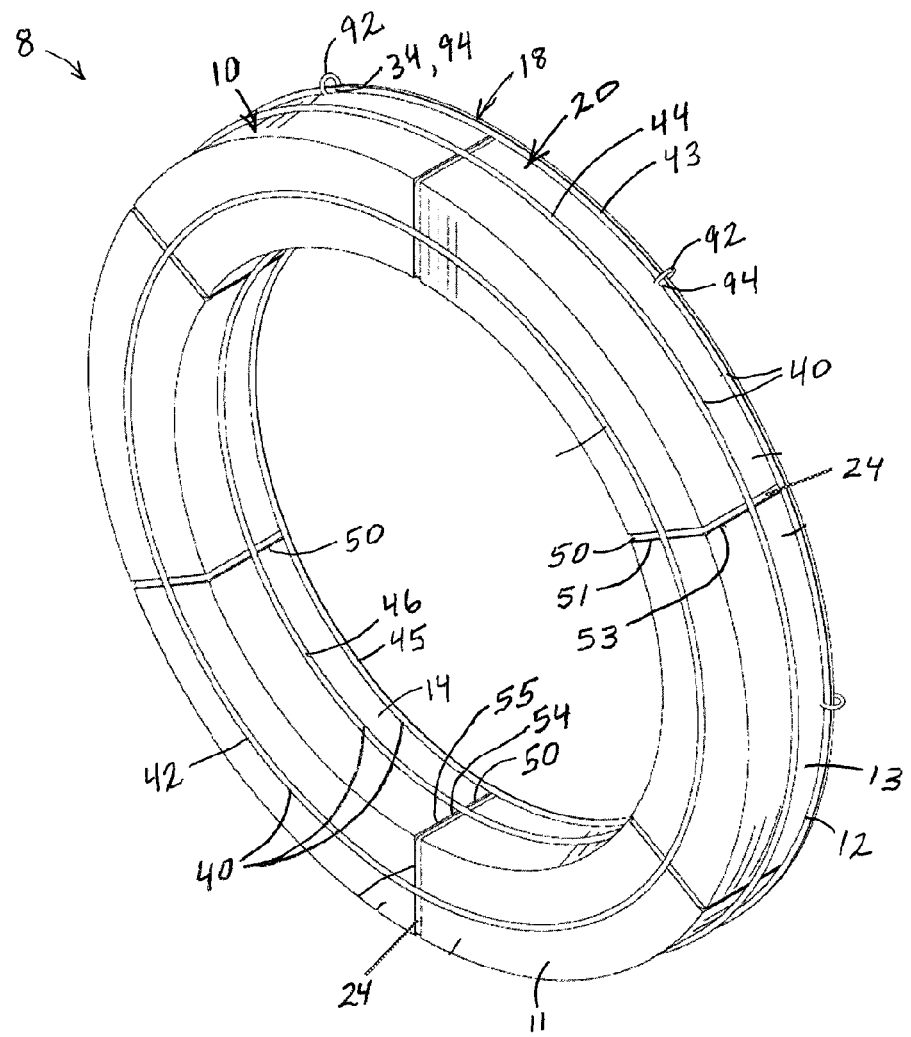
FIG. 2 is an assembled perspective view of the first floral support.
Figure 3:
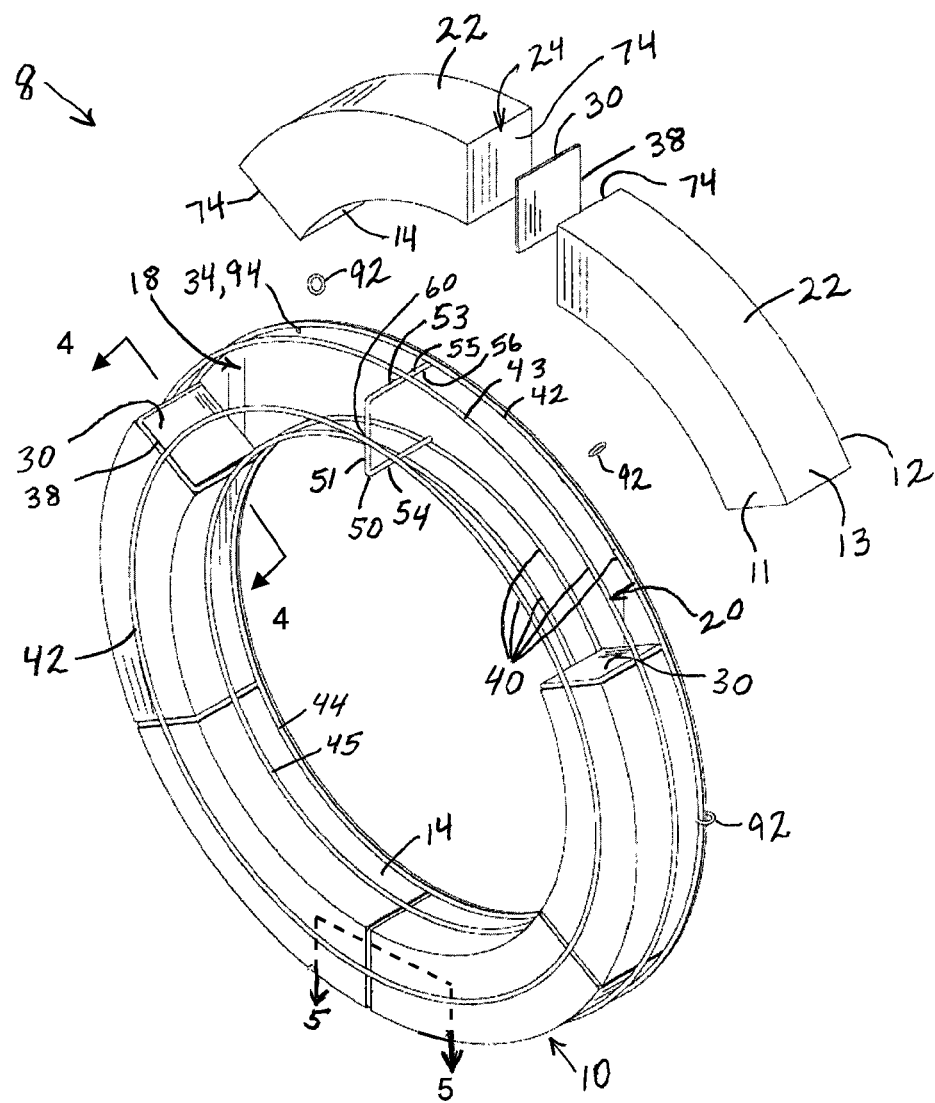
FIG. 3 is a partially-exploded perspective view of the first floral support.

The apparatus 1 in FIGS. 1-3 is a floral arrangement that includes cut flowers 6 attached to a first floral support 8. The floral support 8 includes a pierceable support structure 10 into which the flowers' stems are pierced. The support structure has a front surface 11, a rear surface 12, a closed-curve radially-outer side surface 13, and a closed-curve radially-inner side surface 14. A backplate 18 overlies the support structure's rear surface 12. A frame 20 overlies the support structure's front and side surfaces 11, 13, 14. The support structure 10 is segmented into segments 22, with gaps 24 between adjacent segments. Within each gap 24 is a spacer 30 (or divider) sandwiched between the adjacent segments 22.

Stems of the flowers 6 are preferably cut at an angle in a wedge shape. This facilitates their piercing into the support structure 10. It also increases the surface-area through which the stems imbibe moisture. The flowers can be inserted through, and cover, the support structure's front and side surfaces 11, 13, 14. In examples where the backplate 18 is omitted, they can be inserted also through, and cover, the support structure's rear surface 12.

In this example, the support structure 10 comprises floral foam, which is a foam material that can be pierced by a flower stem and retains the stem, and thus the flower, in a fixed position. It is configured to be moistened with water without degrading. It has an open cell architecture that retains water that is poured over it and allows water at one location within it to migrate to another location within it.

The front and rear surfaces 11, 12 of the foam 10 are parallel and define the depth of the foam. The depth is preferably about 4.7 cm to about 5.3 cm. The foam 10 in this first embodiment is ring-shaped, so that the final floral arrangement 1 will be a floral wreath.

The side surfaces 13, 14 extend along a longitudinal path that in this example is circumferential. In the following description, "transverse" refers to a direction perpendicular to the longitudinal path. Accordingly, at any point along the longitudinal path, each side surface 13, 14 extends "transversely" from the front surface 11 to the rear surface 12. Each side surface 13, 14 also extends perpendicularly, relative to the front surface 11, from the front surface 11 to the rear surface 12. The outer side surface 13 surrounds the inner side surface 14. It is parallel with the inner side surface 14 in that that it is equidistant from the inner side surface 14 along the entire longitudinal path.

The backplate 18 in this example is a flat plate that is molded or cut to have a peripheral edge that follows the outer side surface of the foam 10. The backplate 18 can be impermeable to water or moisture by blocking water or moisture in the foam 10 from migrating out of the foam's rear surface 12 through the backplate 18 to the backplate's rear surface. The backplate 18 thus protects whatever it rests against from moisture. The backplate 18 also blocks the bevel-cut surfaces of the flower stems from being pushed beyond the foam's rear surface 12. The backplate's periphery extends radially outward slightly beyond the foam's outer side surface 13 so that the backplate's entire peripheral edge is visible when viewing the foam 10 from the front. The backplate 18 preferably has a thickness of about 4 mm to about 8 mm. The backplate is preferably made of a material, for example plastic or metal or Coroplast™ corrugated plastic, that is not degraded by moisture, and is stiffer than the foam 10.

The backplate 18 can be stiff enough to substantially support the weight of the foam 10 and flowers 6 without deforming when suspended. Or, the stiffness for supporting the weight of the foam 10 and flowers 6 can be substantially provided by the frame 20 instead of the backplate 18. Alternatively, both the backplate 18 and the frame 20 can be insufficiently rigid to support the weight of the frame 10 and flowers 6, but provide sufficiently rigidity to support the weight of the frame 20 and flowers 6 only when, and due to, the rigidity enhancement provided by their being secured together about their peripheries that exceeds the sum of their rigidities if they were simultaneously supporting the foam and flowers without being secured together.

A suspension structure 34 is used for suspending the floral arrangement 1 in a suspended orientation in which the floral arrangement's center of gravity is directly below the suspension structure 34. The suspension structure 34 in this example defines a suspension hole bored in the backplate 18 at a location radially beyond the foam's outer side surface 13. The suspension hole receives a suspension device for suspending the floral arrangement 1. The suspension device can be, for example, a nail hammered into a door, or a loop or string suspended from a nail in a door.

In this example, each spacer 30 is a flat plate. Like the gap 24 it occupies, the spacer 30 extends perpendicular to the longitudinal path. In this example, each spacer 30 has a rectangular peripheral edge 38 that follows along the foam's top, bottom and side surfaces 11, 12, 13, 14. Preferably, the spacer 30 can completely fill the gap 24 in the longitudinal direction by engaging opposing end surfaces 74 of both adjacent foam segments 22. It can extend, within the gap 24, from the foam's outer side surface 13 to the foam's inner side surface 14. The spacer 30 can extend also from the backplate 18 at the foam's rear surface 12 to, or at least almost to, the foam's front surface 11. The spacer 30 preferably has a thickness of about 4 mm to about 8 mm.

The spacer 30 is of a different material than the foam 10 and is stiffer and more impermeable to water than the foam 10. Examples of the material for the spacer 30 can be those mentioned above as examples of materials for the backplate 18. The spacer 30 resists or prevents water or moisture from migrating through gravity from one segment 22 to another. For that reason, the spacers 30 and the gaps 24 they fill are preferably made at angles that will be less than about 45 degrees, and more preferably less than about 30 degrees, from horizontal when the floral arrangement 1 is suspended. Gaps 24 that will be more vertical than this angle when the floral arrangement 1 is suspended are less needed for preventing water migration from one foam segment 22 to the next.

The frame 20 is a network of elongated bands that are interconnected in a three-dimensional array. The frame 20 helps to support the foam 10 and to hold the foam segments 22 and the spacers 30 together in their proper places relative to each other. The bands 40 in this example are metal wires, although other materials, for example rigid or semi-rigid plastic straps, are possible. Each band 40 preferably has a round cross-section with a thickness or diameter of 2 mm to 3 mm.

The bands in this example include five longitudinal bands 40, or longitudinal wires, extending along the longitudinal path, which in this embodiment is circumferential. They include a front longitudinal wire 42, a base radially-outer longitudinal wire 43, a non-base radially-outer longitudinal wire 44, a base radially-inner longitudinal wire 45, and a non-base radially-inner longitudinal wire 46. The front longitudinal wire 42 overlies and follows along the foam's front surface 11 and is radially centered between the outer and inner side surfaces 13, 14. The foam 10 is captured between the front wire 42 and the backplate 18. The foam's front-to-rear depth can be selected for the foam 10 to engage both the front wire 42 and the backplate 18 simultaneously, or be shorter than that. The foam 10 is further captured between the outer and inner longitudinal wires 44, 46. Both radially-outer longitudinal wires 43, 44 overlie and follow along and engage the foam's outer side surface 13. Similarly, both radially-inner longitudinal wires 45, 46 overlie and follow along and engage the foam's inner side surface 14. While both base longitudinal wires 43, 45 are adjacent to the foam's rear surface 12, the non-base longitudinal wires 44, 46 are more centrally located between the foam's front and rear surfaces 11, 12.

Figure 4:
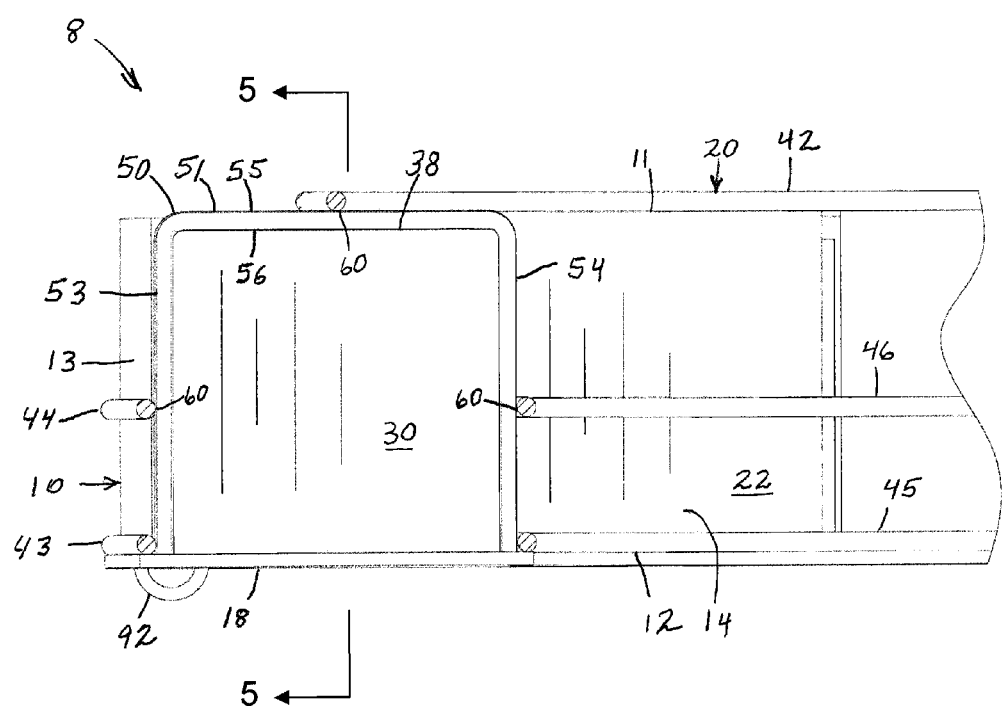
FIG. 4 is a sectional view taken at line 4-4 of FIG. 3.
Figure 5:
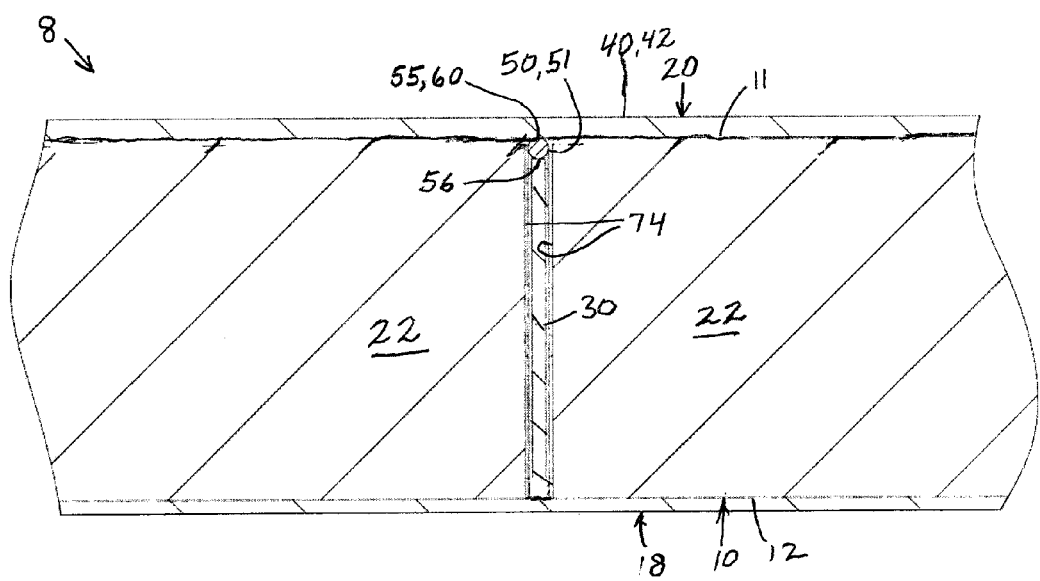
FIG. 5 is a sectional view taken at line 5-5 of FIG. 3.

As shown in FIGS. 3-5, the frame 20 further includes six cross bands 50, or cross wires, each extending transversely about the front and side surfaces 11, 13, 14 of the foam 10. The cross-wires 50 are identically sized and shaped. Each comprises a straight front wire segment 51 and parallel outer and inner straight side wire segments 53, 54 projecting perpendicularly from opposite ends of the front wire segment 51. The front wire segment 51 extends transversely along the foam's front surface 11, and is perpendicular to the foam's side surfaces 13, 14. The outer and inner side wire segments 53, 54 respectively extend transversely along the foam's outer and inner side surfaces 13, 14 and are substantially perpendicular to the foam's front and rear surfaces 11, 12. Each of the cross band's segments 51, 53, 54 has an outer edge 55 that faces away from the foam 10 and an inner edge 56 that faces into the foam 10. The cross band's outer edge 55 can be flush with the adjacent foam surface 11, 13, 14, and its lower edge 56 can be below the adjacent foam surface 11, 13, 14. In another example, the outer and inner edges 55, 56 of any of the wire segments 51, 53, 54 can be above the adjacent foam surface 11, 13, 14. Or the outer edge 55 can be above the adjacent foam surface 11, 13, 14 while the lower edge 56 is below the adjacent foam surface 11, 13, 14, such that the wire segment 51, 53, 54 is sunk partially below the respective foam surface 11, 13, 14.

Each cross wire 50 crosses each of the five longitudinal wires 40 at a crossing point 60. At each crossing point 60, the cross wire segment 51, 53, 54 underlies and is substantially perpendicular to the longitudinal wire 40 that it crosses. At each crossing point 60, the cross wire 50 is adjoined, for example by welding, to the longitudinal wire 42-46 so that all of the longitudinal wires 40 and cross wires 50 are interconnected to form the frame 20.

Each cross wire 50 is located over a respective gap 24 and overlies the peripheral edge 38 of the respective spacer 30. Each cross wire 50 thus hides the gap 24 and its respective spacer 30 from view, and also retains the spacer 30 in the gap 24. Each segment 51, 53, 54 of each cross wire 50 can be slightly wider than the gap 24, and pressed entirely into the gap 24 such that the cross wire segments' outer edge 55 is at the level of the adjacent foam surface 11, 13, 14. This would cause the foam segments 22 to be slightly indented by the cross wire 50, thereby forming a groove in each foam segment's end surface 74. The spacer 30 is preferably sized to extend from the backplate 18 to the cross wire's front segment 51, and to extend from the cross wire's outer side segment 53 to the cross wire's inner side segment 54, so that the spacer-overlying cross wire 70 prevents the spacer from moving.

The frame 20 can include other cross wires 50 that do not overlie a gap 24 but instead overlie a foam segment 22 to help retain the segment 22 in place. Such non-spacer-overlying cross wires are not shown in this example. They can be pressed into the foam segment 22 such that their outer edges 55 are at the level of the adjacent foam surface 11, 13, 14. The wire segments 51, 53, 54 would therefore be entirely located in a groove that they formed in the foam 10 when they were pressed into the foam 10.

Since, in this example, the crossing points 60 are at the foam surface 11, 13, 14, the five longitudinal wires 40 engage the respective foam surfaces 11, 13, 14 along the wires' entire lengths. Therefore, the longitudinal wires 40 prevent the foam 10 from falling out of the frame 20, while the cross wires 50 prevent the foam 10 from sliding circumferentially within the frame 20.

Referring to components shown in FIG. 1, one method for assembling and mounting the floral arrangement 1 is as follows. The frame 20 is placed on a table with its front longitudinal wire 51 contacting the table. The foam segments 22 and the spacers 30 are placed in their proper positions within the frame's cavity. The backplate 18 is laid on top of the foam 10. Then the frame 20 is secured to the backplate 18 by attaching the base radially-outer longitudinal wire 43 to the backplate 18. This can be achieved by passing tie devices 92 around each base wire 43 and through adjacent attachment holes 94 bored along the periphery of the backplate 18. The tie device 92 in this example is a stiff wire that is crimped into a ring shape. In other examples, it is a string that is knotted, or a thin twist-tied wire. The resulting assembly is the floral support apparatus 8 shown in FIG. 2.

Then the foam's front and side surfaces 11, 13, 14 are pierced by stems of the flowers 6, for the foam 10 to retain the flowers 6 in place, yielding the floral arrangement. The floral arrangement can be suspended by its suspension structure 34, for example by hammering a nail through a hole of a string that loops through the suspension structure 34 (which can be one of the attachment wires 92) into a door. The frame 20 holds the foam segments 22 and the spacers 30 in place against the backplate 18, and the backplate 18 and the frame 20 together rigidly support the weight of the floral arrangement 1.

Open Heart Embodiment

Figure 6:
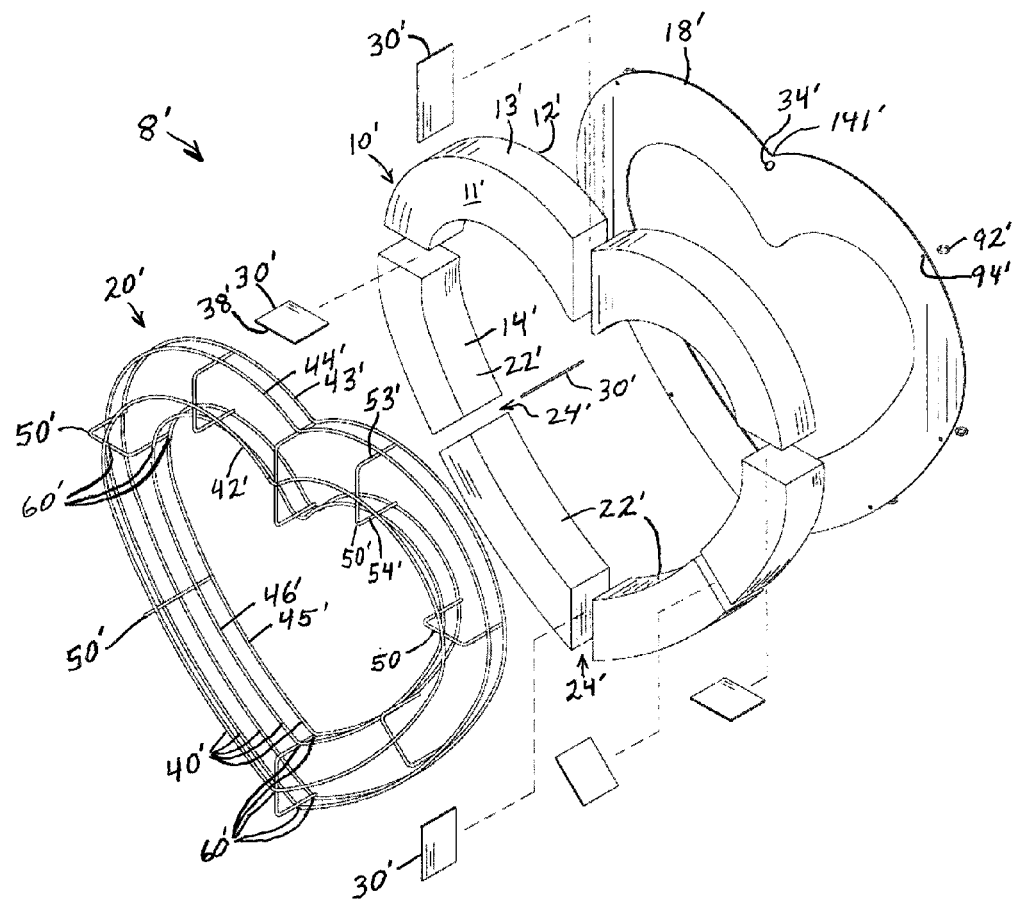
FIG. 6 is an exploded perspective view of a second floral support.
Figure 7:
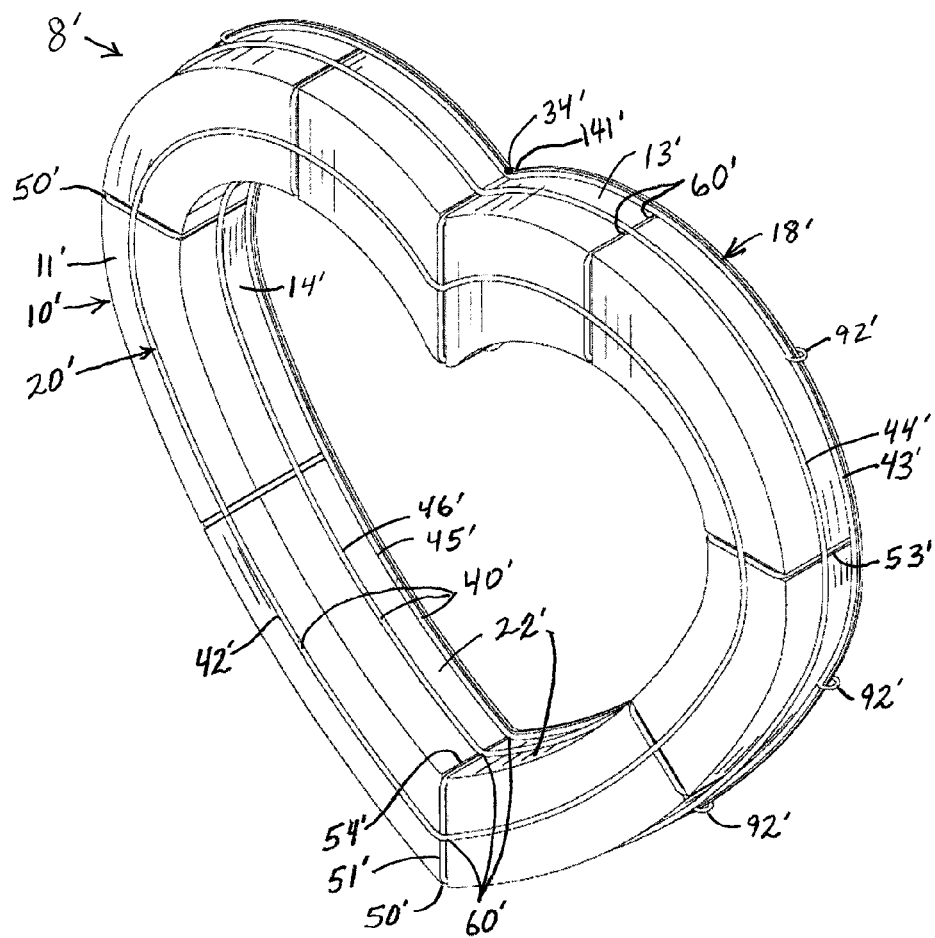
FIG. 7 is an assembled perspective view of the second floral support.

FIGS. 6-7 show a second embodiment that comprises a second floral support 8'. This embodiment has components that are similar in configuration and function to corresponding components of the first embodiment. They are designated in the figures with primed numerals that match the unprimed numerals of the corresponding components in the first embodiment.

The floral support 8' includes an open-heart-shaped floral foam 10' with a matching backplate 18' and a matching frame 20'. Like the ring-shaped foam 10 above, the open-heart-shaped foam 10' of this embodiment follows a closed curve, and has front and rear surfaces 11', 12' and closed-curve outer and inner side surfaces 13', 14'. The longitudinal path of the outer and inner surfaces 13', 14' in this embodiment is heart-shaped. The foam 10' has four foam segments 22' separated by four gaps 24'. Most of the gaps 24' are at angles of less than about 45 degrees, and are preferably less than about 30 degrees, from horizontal when the floral support 8' is suspended.

The frame 20' includes five heart-shaped longitudinal bands 40' (or wires). They comprise a front longitudinal wire 42', a base radially-outer longitudinal wire 43' ("radially" relative to the center of the heart configuration), a non-base radially-outer longitudinal wire 44', a base radially-inner longitudinal wire 45', and a non-base radially-inner longitudinal wire 46'. These longitudinal wires are configured as described above regarding the first embodiment, except that the longitudinal path they follow in this embodiment is heart-shaped instead of ring-shaped.

The frame 20' further includes six cross bands 50' (or wires) that are configured as described above relative to the first embodiment. They overlie and hide the foam's six gaps 24' and six spacers 30'. In other examples, the frame can have cross wires that do not overlie the gaps 24 between the foam segments 22' but instead overlie and press into the foam segments 22' themselves.

Each of the cross wires 50' crosses and adjoins each of the longitudinal wires 40' at a crossing point 60'. At each crossing point 60', the respective cross wire segment 51', 53', 54' is perpendicular to and attached to and underlies the longitudinal wire 40' that it crosses. The cross wires 50' are sunk into the foam 10" such that their outer edges 55' are flush with the adjacent foam surface 11', 13', 14', as they are in the first embodiment shown (FIGS. 3-4). This enables the longitudinal wires 40' to engage the foam surfaces 11'-14'.

The base radially-outer longitudinal wire 43' is tied by tie devices 92' to the open-heart-shaped backplate 18' through attachment holes 94' that are bored along the outer periphery of the backplate 18'. An attachment structure 34' can comprise a hole at a top apex 141' or one of the tie devices 92. The attachment structure 34' is used to attach the resulting open-heart-shaped floral arrangement to a hook or nail on a wall or door.

Cross-Shaped Embodiment

Figure 8:
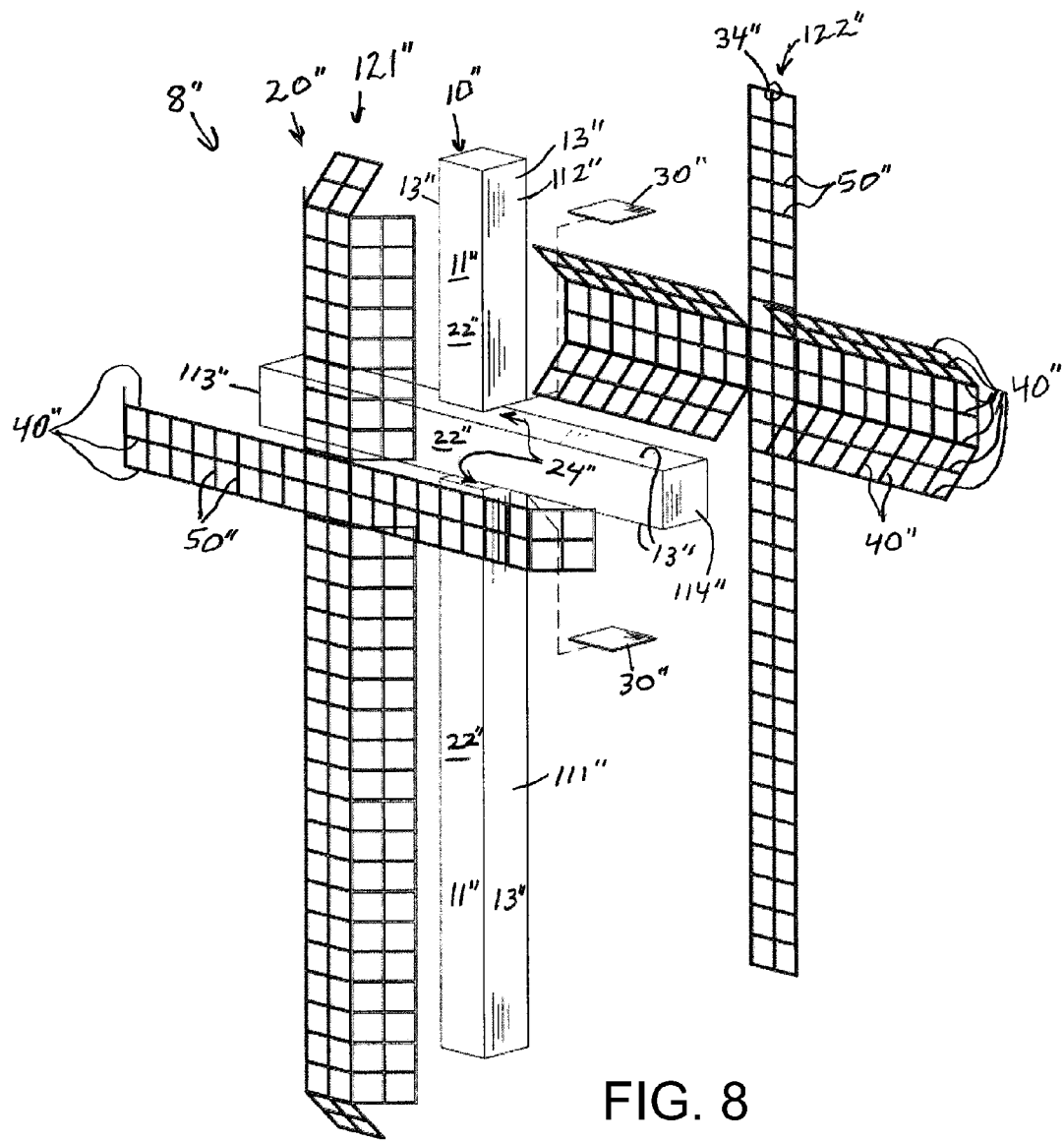
FIG. 8-9 are exploded perspective views of a third floral support, respectively in earlier and later stages of assembly.
Figure 9:
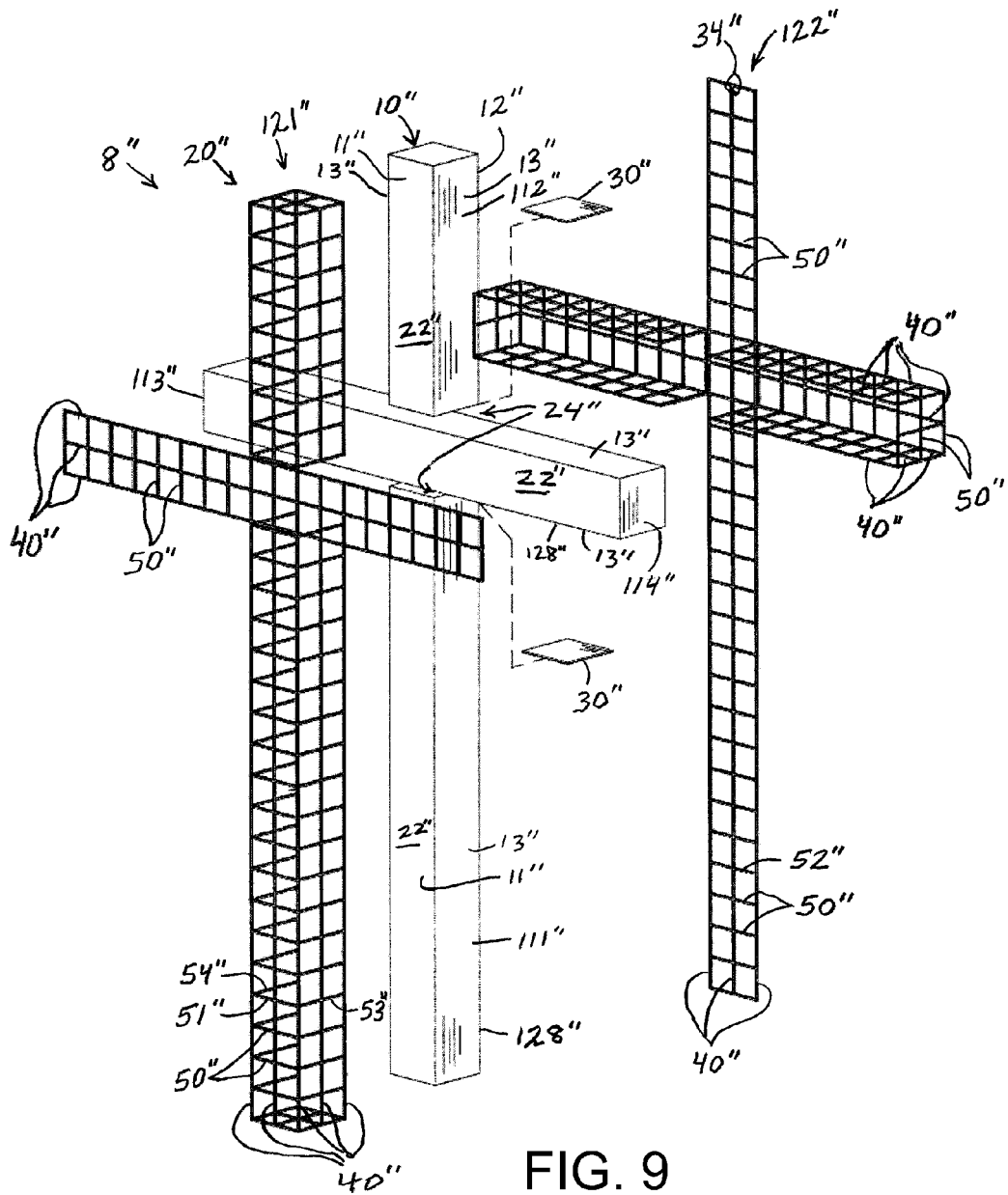
Figure 10:
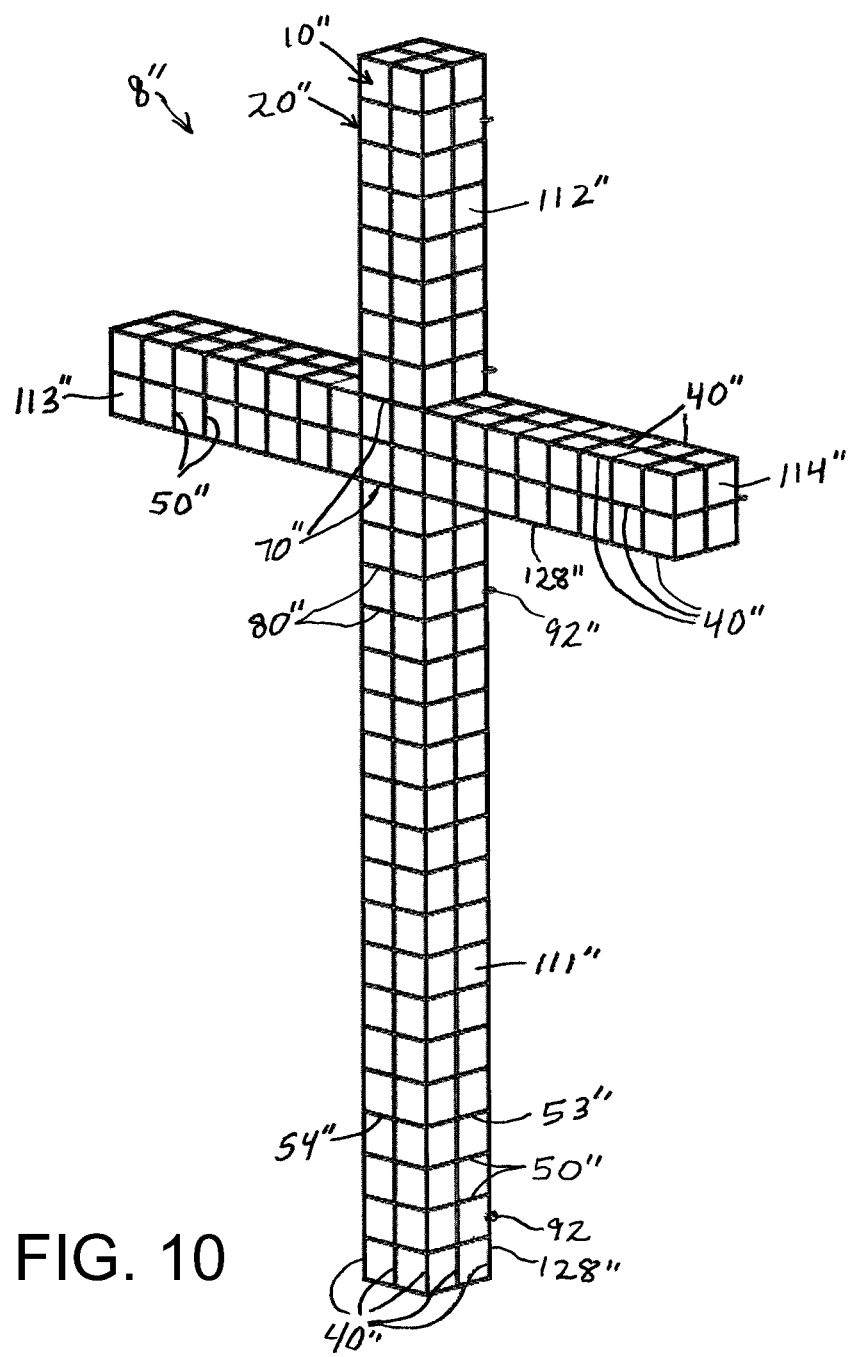
FIG. 10 is an assembled perspective view of the third floral support.

FIGS. 8-10 show a third embodiment that comprises a third floral support 8". This embodiment has components that are similar in configuration and function to corresponding components of the first embodiment. They are designated in the figures with double-primed numerals that match the unprimed numerals of the corresponding components in the first embodiment.

The third floral support 8" includes a cross-shaped floral foam 10". As in the previous embodiments, this foam 10" has parallel front and rear surfaces 11", 12". It further has four pairs of straight radially-outer (radially-outer in that they face away from the foam) side surfaces 13". The four pairs 13" respectively define a lower trunk 111" and an upper trunk 112" both following straight vertical longitudinal paths, and a left arm 113" and a right arm 114" both following straight horizontal longitudinal paths. This foam 10" has no radially-inner side surface (i.e., surface that faces another part of the foam). The foam 10" is segmented by two horizontal gaps 24" into three segments 22". Each gap 24" is occupied by a spacer 30".

This embodiment further includes a cross-shaped frame 20". The frame 20" has longitudinal bands 40", in this case metal wires, that follow the respective longitudinal paths of the foam 10". Some longitudinal bands 40" overlie the foam's front surface 11", some overlie the foam's rear surface 12", and others overlie the foam's side surfaces 13". Some are transversely centered on the respective front, rear and side surfaces 11", 12", 13", while others overlie a longitudinal edge of the foam 10".

Unlike the previous embodiments, this embodiment lacks a backplate. Instead, the frame 20" that overlies the front and sides surfaces 11", 13" also overlies the rear surface 12", to surround the foam 10" on all sides. When the frame 20" is suspended from its top, such as by a string 34" tied to the top of the frame 20", the frame 20" itself supports the weight of the floral arrangement and prevents the foam 10" from bending. Alternatively, this embodiment can include a backplate that is within the frame and underlies the foam.

The frame 20" further includes cross wires 50", each encircling one of the trunks 111", 112" or arms 113", 114". Each cross wire 50" has four straight segments, respectively overlying the four surfaces 11", 12", 13", 14" of the foam 10". Each segment extends in a transverse direction relative to the longitudinal direction of the foam component (trunk 111", 112" or arm 113", 114") that the cross wire 50" encircles. Each cross wire 50" perpendicularly crosses and adjoins and underlies each of the longitudinal wires 40" at a crossing point 60". The cross wires 50" are sunk into the foam 10" such that their outer edges 55" of the cross wire 50" are flush with the adjacent foam surface 11"-14", as they are in the first embodiment (FIGS. 1-5). This enables the longitudinal wires 40" to engage the foam surfaces 11", 12", 13". Some of the cross wires 50" encircle and overlie a respective gap 24". Other cross wires 24" encircle and overlie and are sunk into a foam segment 22".

Figure 11:
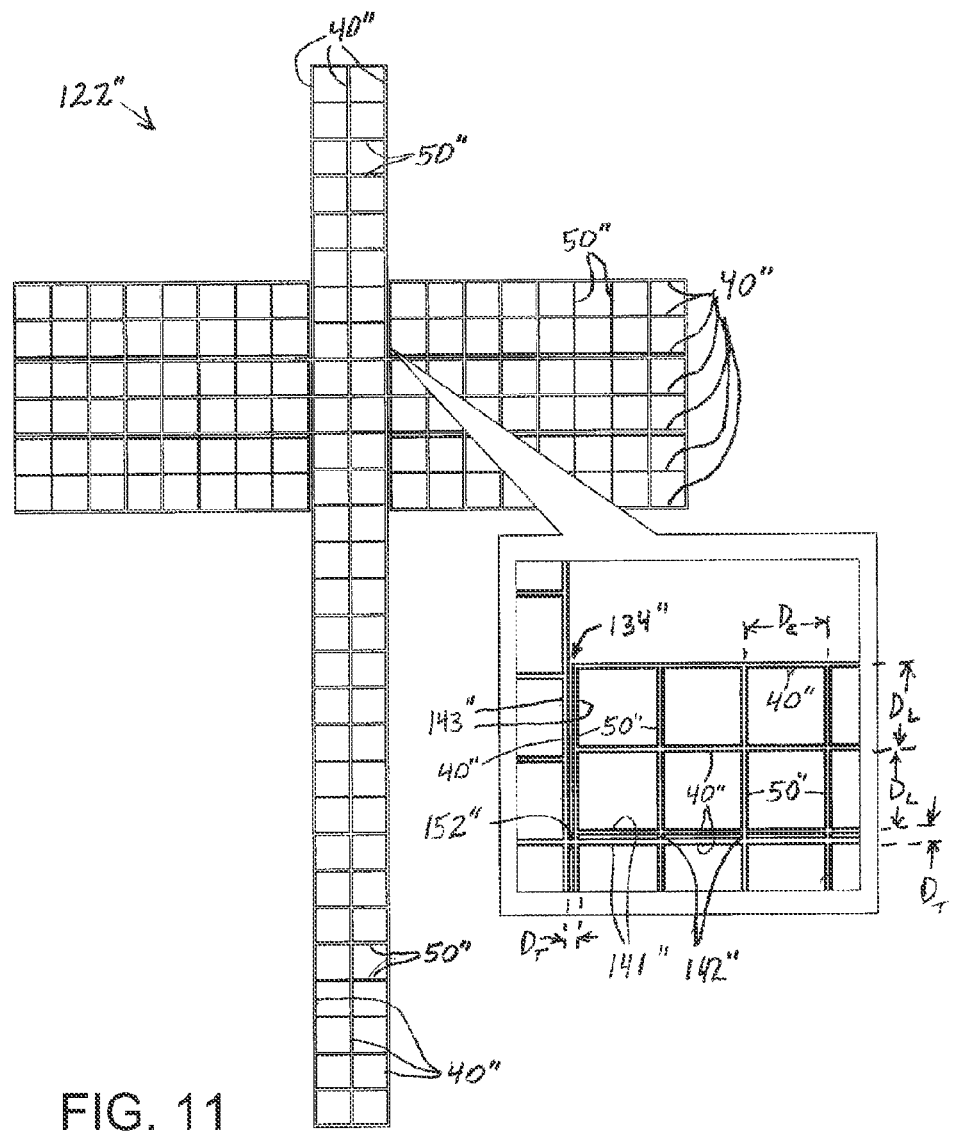
FIG. 11 is a front view of a section of a frame of the third floral support, the frame section being in a flattened configuration prior to assembly.

The frame 20" is assembled from two frame pieces 121", 122". Each frame piece is initially stored in a flat configuration, as shown in FIG. 11 with reference to one frame piece 122". Edges of each frame piece 121", 122" are then bent into an intermediate configuration shown in FIG. 8, and then bent further into a final configuration shown in FIG. 9.

Assembling the frame 20" can include the steps of 1) bending the frame pieces 121", 122" as explained above; 2) placing the frame pieces 121", 122" about the foam 10"; and 3) then securing them together with tie devices 92". This results in some longitudinal wires 40" along the cross's edges 128" being composed of two wires (one from each frame piece 121", 122") that are attached together to comprise a single band 40".

As shown in FIG. 11, in each of the frame pieces 121", 122", spacing $D_L$ between adjacent longitudinal wires is generally uniform, and spacing $D_C$ between adjacent cross wires is generally uniform. Spacing $D_L$ is substantially equal to spacing $D_C$, to provide square openings bounded by the wires. Some pairs of bands 40" are twinned in that they are formed of two wires that are much more closely spaced apart, as indcated by $D_T$ in FIG. 11, than $D_L$ or $D_C$, such as less than one third, even less than one fourth, or even less than one fifth of $D_L$ or $D_C$, and for example by 3/16 inch.

A first type of a twinned pair of wires 141" comprises two longitudinal wires 40" that are attached together by short segments 142" of cross wires 50", with spacing $D_T$. The short segments 142" are bent when the frame pieces 121", 122" are bent from the flat configuration (FIG. 11) to the final configuration(FIG. 9) described above. This helps ensure that each edge of each foam surface 11", 12", 13", 14" will be overlayed by a longitudinal wire 40".

A second type of a twinned pair of wires 143" comprises one longitudinal wire 40" and one cross wire 50",with spacing $D_T$. These two wires are not connected together by a short segment of wire, so that the cross wire 50" can be bent out of the plain of the longitudinal wire 40" when the frame pieces 121", 122" are bent from the flat configuration (FIG. 11) to the final configuration (FIG. 9) described above. This helps ensure that all distal ends of the longitudinal wire 40" will be bridged by a cross wire 40".

Solid Heart Embodiment

Figure 12:
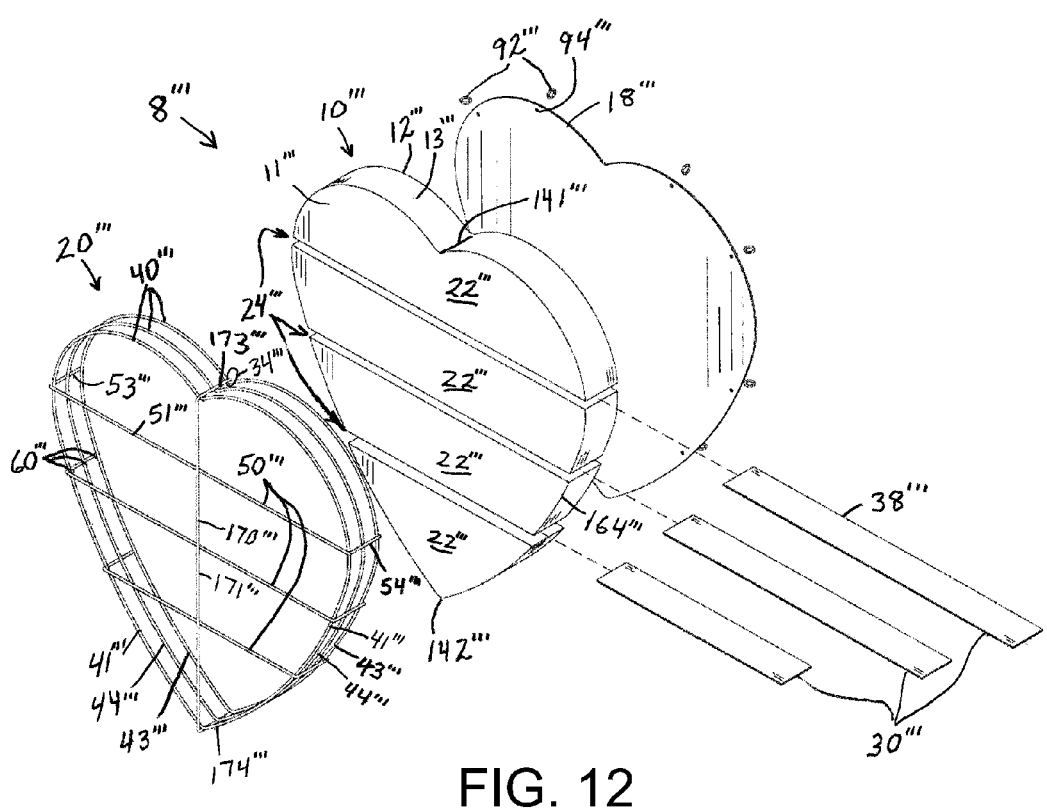
FIG. 12 is an exploded perspective view of a fourth floral support.
Figure 13:
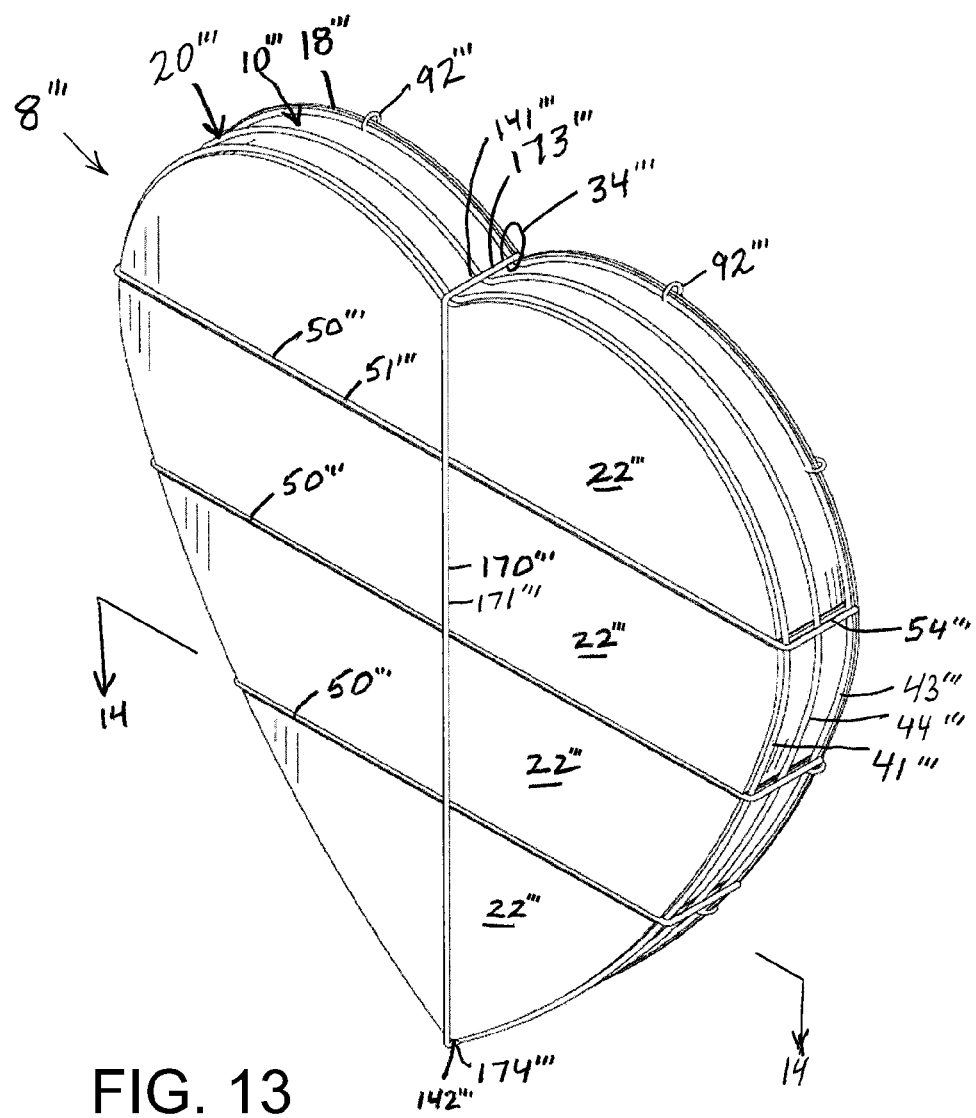
FIG. 13 is an assembled perspective view of the fourth floral support
Figure 14:
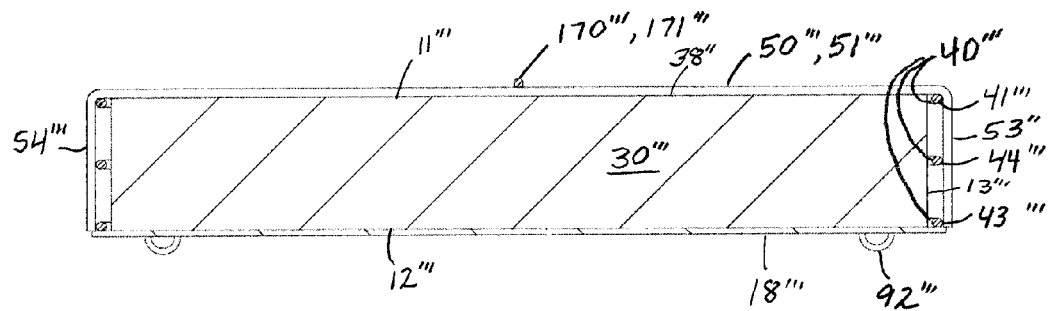
FIG. 14 is a sectional view taken at line 14-14 of FIG. 13.

FIGS. 12-14 show a fourth embodiment that comprises a fourth floral support 8'''. This embodiment has components that are similar in configuration and function to corresponding components of the first embodiment. They are designated in the figures with triple-primed numerals that match the unprimed numerals of the corresponding components in the first embodiment.

The fourth floral support 8''' includes a solid-heart-shaped foam 10'''. This foam 10''' includes parallel front and rear surfaces 11''', 12'''. It further includes a closed-curve radially-outer side surface 13''' that follows a heart-shaped longitudinal path. This close-curve side surface 13''' is equivalent to two half-heart shaped open-curve side surfaces 13''' whose opposite ends meet at two junctures that are located respectively at the upper and lower apexes 141''', 142'''. This foam 10''' has no radially-inner side surface (i.e., a surface having two sections that face each other). The foam 10''' is segmented by three horizontal gaps 24''' into four segments 22'''. Each gap 24''' is occupied by a spacer 30''' whose rectangular peripheral edge 38''' extends along the foam's front, rear and side surfaces 11''', 12''', 13'''.

A frame 20''' includes three longitudinal wires 40''' that follow the heart-shaped longitudinal path and overlie the foam's side surface 13'''. They comprise one longitudinal wire 41''' adjacent the foam's front surface 11''', one longitudinal wire 43''' adjacent the rear surface 12''', and one longitudinal wire 44''' substantially centered between the foam's front and rear surfaces 11''', 12'''.

The frame 20''' further includes three cross wires 50'''. Each cross wire 50''' has three straight segments 51''', 53''', 54''' that extend in respective transverse horizontal directions. Each cross wire 50''' crosses and adjoins and is attached to each of the longitudinal wires 40''' at a crossing point 60'''. The cross wire 50''', at its side segments 53''', 54''', is perpendicular to each longitudinal wire 44''' that it crosses at each respective crossing point 60'''.

In contrast to the previous embodiments, the cross wires 50''' in this embodiment overlie the longitudinal wires 40''' as shown in FIG. 14. The cross wires 50''' are spaced away from the foam's side surface 13''' by the longitudinal wires 40''', which engage the foam's side surface 13''' and the spacers 30'''. Since no longitudinal wires 50''' overlie the foam's front surface 11''', the cross wires 50''' can engage the spacers' edges 38''' that are flush with the foam's front surface 11'''. Accordingly, the longitudinal wires 40''' prevent the spacers 30''' from moving sideways, while the cross wires 50''' prevent the spacers 30''' from moving forward (away from the backplate 18''').

As shown in FIGS. 13-14, a third type of wire 170''' has a straight vertical segment 171''' extending along the foam's front surface 11''' and two horizontal segments 173''', 174''' extending along the foam's upper and lower apexes 141''', 142'''. This third type of wire 170''' perpendicularly crosses and is adjoined to each longitudinal wire 40''' and each cross wire 50'''. This third type of wire 170''' is spaced above the foam's front surface 11''' by the cross wires 50''', and spaced above (away from) the foam's side surface 13''' (at the apexes 141''', 142''') by the longitudinal wires 40'''.

The base longitudinal wire 43''' is secured, such as by with twist ties 92''', to the heart-shaped backplate 18''' through attachment holes 94''' along the backplate's periphery. A suspension structure 34''', in this example a wire loop, loops around the top segment 173''' of the third type of wire 170''' for suspending the floral arrangement from a nail or hook on a wall or door.

Alternative Embodiment

Figure 15:
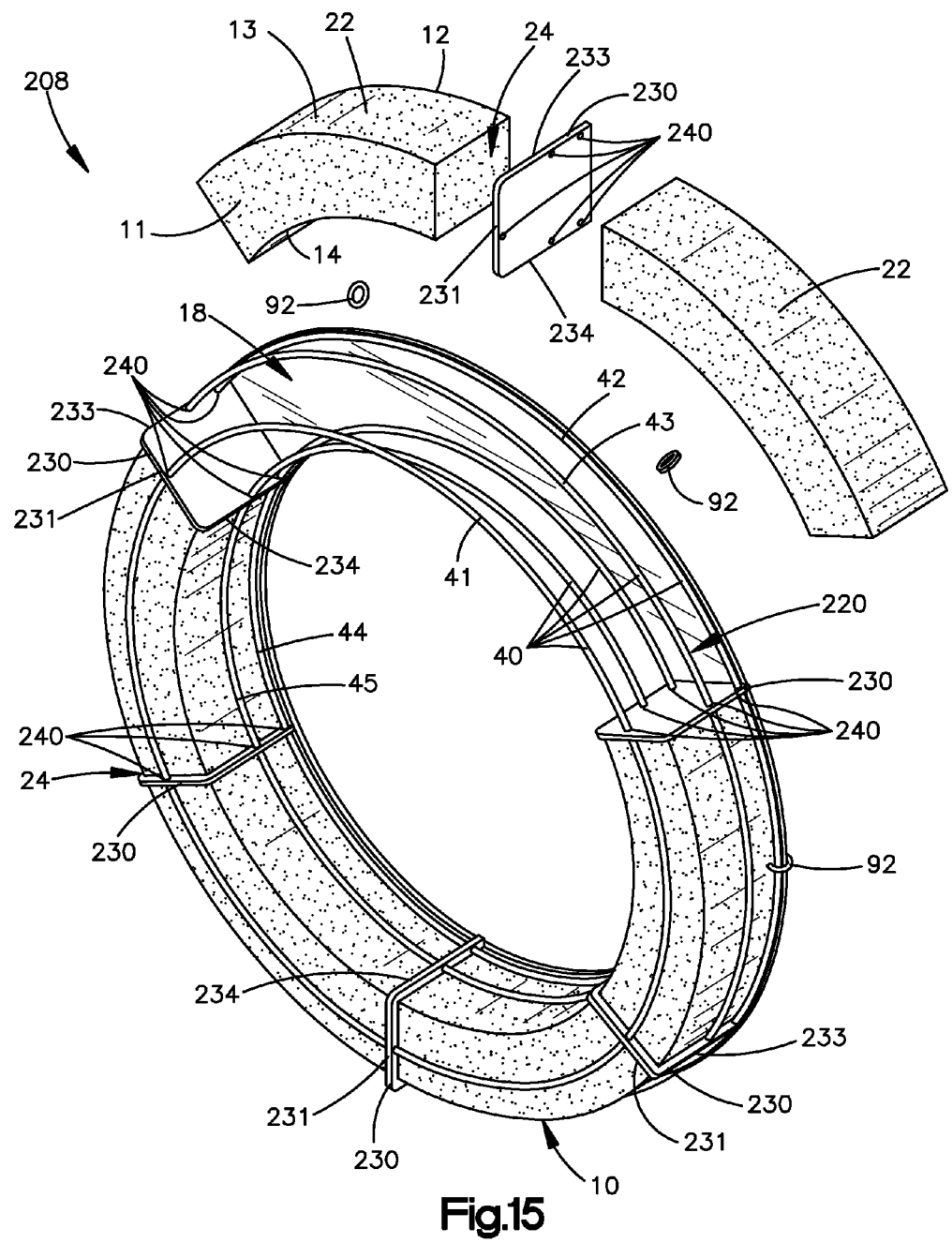
FIG. 15 is a partially-exploded perspective view of an alternative support structure.

Another floral support 208 is shown in FIG. 15. It has the same floral foam 10 and backplate 18 as the first embodiment (FIGS. 1-5). And it has a frame 220 that includes the same longitudinal bands 40 as those of the frame 20 of the first embodiment.

This alternative embodiment differs from the first embodiment in the following ways: Its spacers 230 include a front peripheral section 231 that projects forward beyond the foam's front surface 11, and radially outer and inner peripheral sections 233, 234 that respectively project laterally beyond the foam's radially outer and inner side surfaces 13, 14. Each spacer's peripheral sections 231, 233, 234 together have five holes 240 that closely and snugly receive the five longitudinal bands 40.

Each band 40 in this example can start out as a plastic cord with a circular cross-section. Each cord can be threaded through its respective hole 240 in each spacer 230. Then the cord's two opposite ends can be joined together, such as by welding, to form the closed-loop band 40.

The bands 40 and the spacers 230 can be free to slide circumferentially relative to each other. Alternatively, the bands 40 and the spacers 230 can be prevented from sliding circumferentially relative to each other. This can be done by adhering each band 40, such as by gluing or welding, to the spacers 230. Or it can be done by each hole 240 being slightly narrower than the width of the respective the band 40. If the hole 240 and the band 40 have a circular cross-section, this would correspond to the hole 240 having a smaller diameter than the diameter of the band 40. During assembly, the band 40 would be forced through the hole 240 against resistance of friction between the walls of the hole 240 and the band 40. Consequently, after final assembly, the friction would resist the band 240 from sliding through, and relative to, the hole 240. To enable the hole 240 to widen to make room for the band 40 to pass through, a small slit (not shown), extending from the hole 240, can be cut into the spacer 30. As the band 40 is forced through the hole 240, the slit would open to increase the diameter of the hole 240, while providing friction between the walls of the hole 240 and the band 40.

The bands 40 and the spacers 230 hold each other in place to form the frame 220. The rearmost radially-outer band 42 of the longitudinal bands 40 is hooked by the tie devices 92 to the backplate 18. The bands 40 hold the foam segments 22 and the spacers 30 against the backplate 18 and prevent the foam segments 22 and the spacers 30 from moving laterally out of their respective positions.

In this example, all of the spacers 230 have the holes 240 to receive the longitudinal bands 40. Alternatively, some gaps 24 in the foam 10 can contain a spacer similar to the spacers 30 of the first embodiment that have neither the sections 231, 233, 234 that project beyond the foam 10 nor the holes 240. Those spacers would not help to hold the bands 40 in place, but would be blocked by the bands 40 from slipping out from their respective gaps 24.

In another example, the spacers 230 and the backplate 18 of FIG. 15 are joined together. This could be achieved by molding the spacers 230 and the backplate 18 as a one-piece structure from the same material, such as thermoplastic. That would lessen the need for the base bands 42, 44 extending along the backplate 18, so the base bands 42, 44 could be omitted. That would leave, in this example, one front band 41 along the foam's front surface 11, one outer side band 43 extending longitudinally along the middle of the foam's outer side surface 13, and one inner side band 45 extending longitudinally along the middle of the foam's inner side surface 14.

Each band 41, 43, 45 could be installed by threading an open-loop cord through respective holes 240 in the spacers 230, and then joining the cord's two opposite ends together to form the respective closed-loop band 40. This assembly step is facilitated by the spacers 230 being fixed in place to the backplate 18.

Figure 16:
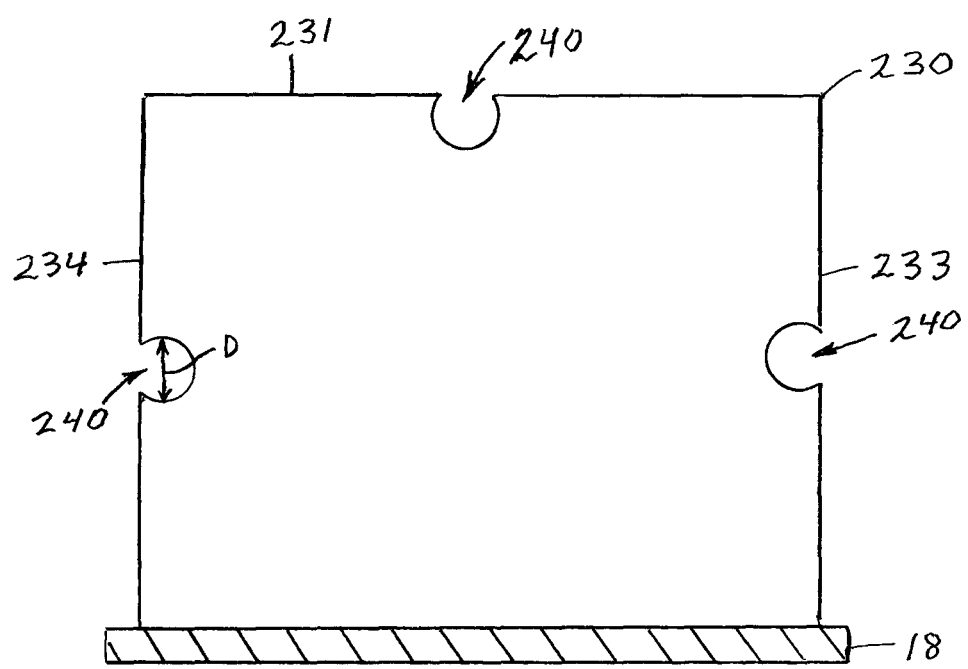
FIG. 16 is a sectional view of another alternative support structure.

Alternatively, as shown in FIG. 16, each hole 240 can extend to its nearest outer edge 231, 233, 234 of the spacer 230, to form a recess in the respective edge 231, 233, 234. In that case, each cord would not need to be inserted through the spacers 230 before its ends are joined together. Instead, each band 40, while already in its closed-loop form, could be inserted into the recesses 240. This might require contorting the backplate 18 or the spacers 230 to enable the side bands 43, 45 to enter their respective recesses 240 in the outer and inner edges 233, 234 of the spacers 230.

To impede the bands 40 from slipping out of the recesses 240, each recess 240 in FIG. 16 is C-shaped, in that the gap in the spacer edge 231, 233, 234 that defines the recess' entrance is smaller than both the width (in this case diameter D) of the recess and the width (in this case diameter) of the band 40. So the band 40 would require force to snap it into place within the recess 240, and require force to be removed from the recess 240.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have elements that do not differ from the literal language of the claims, or if they include equivalent structural elements with insubstantial differences from the literal language of the claims.

The invention claimed is:

1. An apparatus comprising:
   a support structure configured to be pierced by stems of flowers to hold the flowers in place and to retain moisture, and having front and rear surfaces and two opposite side surfaces, the side surfaces extending along a longitudinal path;
   a backplate underlying the support structure's rear surface;
   a frame overlying the support structure and attached to the backplate to hold the support structure against the backplate, the frame including longitudinal bands that extend continuously along the entire longitudinal path and overlie the support structure and cross bands that extend about the support structure's front and side surfaces, each cross band crossing each longitudinal band at a crossing point at which the cross band is adjoined to and underlying the respective longitudinal band; and
   a plurality of tie devices,
   wherein the longitudinal bands include a front longitudinal band that overlies the front surface between the two opposite side surfaces of the support structure and a non-base longitudinal band that overlies one of the two opposite side surfaces between the front and rear surfaces of the support structure,
   wherein the backplate comprises a plurality of attachment holes, and
   wherein each respective tie device in the plurality of tie devices is engaged with a corresponding attachment hole in the plurality of attachment holes to tie the frame to the backplate.

2. The apparatus of claim 1 wherein the support structure is floral foam.

3. The apparatus of claim 1 wherein the backplate is configured to rigidly support the weight of a floral arrangement.

4. The apparatus of claim 1 wherein the longitudinal and cross bands are of metal wire.

5. The apparatus of claim 1 wherein the longitudinal and cross bands have a round cross-section.

6. The apparatus of claim 1 further comprising flowers whose stems pierce the support structure for the support structure to hold the flowers in place.

7. The apparatus of claim 1 wherein at least one of the cross bands is sunk at least partially below the adjacent surface of the support structure.

8. The apparatus of claim 1 wherein the support structure is segmented, to include at least two segments with a transversely-extending gap in-between, and the apparatus further includes a plate-shaped spacer extending transversely in the gap, and at least one of the cross bands overlies a front edge and side edges of the spacer to retain the spacer in the gap.

9. The apparatus of claim 1 wherein at least one of the longitudinal bands extends along a longitudinally-extending rear edge of the support structure and is attached to the backplate to secure the frame to the backplate.

10. The apparatus of claim 1 wherein the two opposite side surfaces respectively comprise a closed curve inner side surface and a closed curve outer side surface, the outer side surface encompassing the inner side surface.

11. The apparatus of claim 10 wherein the support structure is ring-shaped, such that the longitudinal path follows a circumferential path and the inner side surface and the outer side surface respectively define the inner and outer diameters of the ring shape.

12. The apparatus of claim 10 wherein the support structure is open-heart-shaped, such that the longitudinal path and the inner and outer side surfaces all follow a heart-shaped path.

\* \* \* \* \*